US009983577B2

(12) United States Patent
Masse et al.

(10) Patent No.: US 9,983,577 B2
(45) Date of Patent: May 29, 2018

(54) METHOD OF MONITORING A DEGRADATION OF A DEVICE ON BOARD AN AIRCRAFT INCLUDING THE DETERMINATION OF A COUNTING THRESHOLD

(71) Applicant: SAFRAN AIRCRAFT ENGINES, Paris (FR)

(72) Inventors: Jean-Remi Andre Masse, Moissy-Cramayel (FR); Pierre Gerald Lalonde, Moissy-Cramayel (FR); Aurore Fabienne Paule Humeau, Blagnac (FR); Armand Dariouche Alimardani, Blagnac (FR); Guilhem Alcide Auguste Foiret, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days. days.

(21) Appl. No.: 15/320,713

(22) PCT Filed: Jun. 16, 2015

(86) PCT No.: PCT/FR2015/051586
§ 371 (c)(1),
(2) Date: Dec. 20, 2016

(87) PCT Pub. No.: WO2015/197944
PCT Pub. Date: Dec. 30, 2015

(65) Prior Publication Data
US 2017/0160734 A1 Jun. 8, 2017

(30) Foreign Application Priority Data
Jun. 25, 2014 (FR) .................................. 14 55921

(51) Int. Cl.
*G05B 23/02* (2006.01)
*B64F 5/60* (2017.01)
(Continued)

(52) U.S. Cl.
CPC ............ *G05B 23/0283* (2013.01); *B64F 5/60* (2017.01); *G01M 15/14* (2013.01);
(Continued)

(58) Field of Classification Search
None
See application file for complete search history.

(56) References Cited

U.S. PATENT DOCUMENTS 6,892,163 B1 * 5/2005 Herzog ................ G06K 9/6278
700/30
7,933,754 B2 * 4/2011 Goebel .................. G05B 17/02
703/6
(Continued)

FOREIGN PATENT DOCUMENTS

| EP | 2075474 A2 | 7/2009 |
|---|---|---|
| WO | WO-2013171427 A1 | 11/2013 |
| WO | WO-2014064396 A2 | 5/2014 |

OTHER PUBLICATIONS

International Search Report with English language Translation, dated Oct. 1, 2015, PCT Application No. PCT/FR2015/051586.
(Continued)

*Primary Examiner* — Redhwan K Mawari
*Assistant Examiner* — Edward Torchinsky
(74) *Attorney, Agent, or Firm* — Womble Bond Dickinson (US) LLP (57) ABSTRACT

A method for monitoring degradation of an onboard device of an aircraft, implemented by a computer, the degree of degradation of the onboard device being defined by an
(Continued)

abnormality score formed by the counting of occurrences of abnormalities noted by a control system of the device, the monitoring method comprising a step of comparing an abnormality score obtained for an observation sequence of given length (n, t) with a decision threshold (ks) and a step of issuing an alarm in the event of the decision threshold (ks) being reached or exceeded, the decision threshold (ks) being determined automatically for a given probability of alarm Pa, corresponding to the probability that an alarm will be issued during the monitoring method whereas the onboard device is sound, by means of the following steps:

- a step of obtaining an abnormality score (r) on at least one reference sequence corresponding to flights of the aircraft without degradation and with a length (m, tc) equal to a plurality of lengths (n, t) of observation sequences;
- a step of adjusting a discrete probability law making it possible to find the abnormality score (r) obtained on the reference sequence;
- a step of calculating the decision threshold (ks) such that, by applying the adjusted discrete probability law during the previous step to an observation sequence having the given length (n), the probability of an abnormality score higher than or equal to the decision threshold (ks) occurring is less than the given alarm probability Pa, or an elementary probability that is a function of Pa in the case where a confirmation strategy is used.

10 Claims, 2 Drawing Sheets

(51) Int. Cl.
*G01M 15/14* (2006.01)
*G06Q 10/06* (2012.01)
*G06Q 10/00* (2012.01)

(52) U.S. Cl.
CPC ..... *G05B 23/0262* (2013.01); *G06Q 10/0631* (2013.01); *G06Q 10/20* (2013.01)

(56) References Cited

U.S. PATENT DOCUMENTS

| | | | |
|---|---|---|---|
| 8,700,550 B1 | 4/2014 | Bickford et al. | |
| 9,346,558 B2* | 5/2016 | Masse | G05B 23/0235 |
| 2005/0143873 A1 | 6/2005 | Wilson | |
| 2007/0028219 A1 | 2/2007 | Miller et al. | |
| 2008/0255776 A1* | 10/2008 | Beard | G01N 29/041 |
| | | | 702/35 |
| 2008/0312783 A1* | 12/2008 | Mansouri | G07C 5/0808 |
| | | | 701/31.4 |
| 2010/0030519 A1* | 2/2010 | Collier | F41G 7/007 |
| | | | 702/181 |
| 2011/0265026 A1* | 10/2011 | Tarassenko | A61B 5/02055 |
| | | | 715/771 |
| 2011/0307743 A1 | 12/2011 | Khalak et al. | |
| 2013/0024179 A1 | 1/2013 | Mazzaro et al. | |
| 2013/0179097 A1* | 7/2013 | Masse | G05B 23/0254 |
| | | | 702/55 |
| 2013/0274991 A1* | 10/2013 | Cheriere | B64F 5/0081 |
| | | | 701/32.9 |
| 2015/0073650 A1* | 3/2015 | Masse | G05B 23/024 |
| | | | 701/32.1 |
| 2015/0134198 A1* | 5/2015 | Masse | G05B 23/0235 |
| | | | 701/34.2 |
| 2017/0160734 A1* | 6/2017 | Masse | G05B 23/0283 |

OTHER PUBLICATIONS

V Chandola et al: "Anomaly Detection for Discrete Sequences: a Survey", IEEE Transactions on Knowledge and Data Engineering, Jan. 1, 2012, pp. 823-839, XP055170010, New York DI: 10.1109/TKDE.2010.235.

* cited by examiner

METHOD OF MONITORING A DEGRADATION OF A DEVICE ON BOARD AN AIRCRAFT INCLUDING THE DETERMINATION OF A COUNTING THRESHOLD

GENERAL TECHNICAL FIELD AND PRIOR ART

The present invention relates to the field of the monitoring of degradation of an onboard device of an aircraft, in particular on a turbine engine. More particularly, the invention relates to devices such as, for example, a measuring chain, for which a soundness indicator is linked to the appearance or not of events.

In order to monitor an onboard device, forming an indicator that is characteristic of degradation of the onboard device is known. This indicator is known to persons skilled in the art by the term abnormality score. Conventionally, an abnormality score is formed from measurement of physical parameters of the onboard device such as, for example, a geometric position, a control current, an aperture angle, a temperature, etc. The abnormality score is characteristic of the degree of damage in the degradation. Preferably, an abnormality score is formed at each flight of the aircraft.

In order to determine whether the onboard device is actually degraded, the monitoring method comprises a step of comparing an abnormality score obtained for a given flight of the aircraft with a decision threshold and a step of issuing an alarm in the event of the decision threshold being exceeded. Thus, by monitoring the change in the abnormality score, it is detected whether the degree of degradation is increasing, and it is possible to anticipate the risk of failure of the onboard device and to improve the management of the maintenance operations.

The setting of the decision threshold for a given degradation is crucial since, on the one hand, an excessively low decision threshold causes the issuing of frequent alarms whereas the degradation is not established (false alarm) and, on the other hand, an excessively high decision threshold inhibits the issuing of alarms when degradation is established (non-detection).

Conventionally, for each degradation that it is wished to detect, the value of the decision threshold is defined empirically. In order to ensure maximum safety, the value of the decision thresholds is generally under-evaluated in order to minimise a risk of non-detection. The result is that the number of false alarms remains high, which presents a drawback for airlines, which are forced to frequently implement a maintenance operation whereas the onboard aeronautical device is not degraded. In order to eliminate this drawback, airlines determine, for the manufacturer of onboard devices, specifications requiring the risk of error to be limited. Because of the precision required, any empirical definition of a decision threshold for a fault-monitoring method is then proscribed.

The patent application FR 1254506 provides a solution to this requirement, and describes a method for monitoring degradation of an onboard device of an aircraft, implemented by a computer, the degree of the degradation of the onboard device being defined by an abnormality score formed from measurements of physical parameters of the onboard device, the monitoring method comprising a step of comparing an abnormality score obtained for a given flight of the aircraft with a decision threshold and a step of issuing an alarm in the event of the decision threshold being exceeded, the decision threshold being determined automatically for a given probability of alarm Pa, corresponding to the probability that an alarm is issued in the course of the monitoring method whereas the onboard device is sound, by means of the following steps:

a step of calculating a plurality of abnormality scores for a plurality of flights of the aircraft without degradation so as to obtain a distribution of the probability density of the abnormality score, the distribution being particular to the physical nature of the onboard device;

a step of adjusting the distribution by means of a non-parametric estimator of the probability density so as to obtain a continuous adjusted distribution function;

a step of calculating a continuous adjusted probability distribution function from the continuous adjusted distribution function, and a step of reading the antecedent of the continuous adjusted probability distribution function for a given value (1-Pa in the prior application), the antecedent corresponding to the decision threshold.

The patent application FR 1358593 provides an improvement to the previous invention by introducing a "k from amongst n" confirmation strategy, for which an alarm is issued only if there are at least k threshold exceedings in n successive flights.

This method makes it possible to determine the decision threshold automatically with great precision according to the alarm probability Pa corresponding to the requirements of the airlines. Such a method is reliable compared with the methods of the prior art. This makes it possible to precisely detect any degradation of an onboard device and to anticipate any failure of the latter during monitoring.

However, such a method is in general not applicable when the distribution of the abnormality score is not continuous but discrete.

By way of example, it is known through the patent application filed in France on 15 Sep. 2001 under the U.S. Pat. No. 2,980,266, from the company SNECMA, a system for monitoring a measuring chain of a turbojet engine for which the abnormality score is defined by the counting, in the course of successive time increments, of the number of "undesirable" transitions from the soundness word "OK" to another soundness word indicating malfunctioning. It happens that this counting is almost always zero. In the example presented in FIG. 1, out a total number of 750 flights without degradation, one flight had one degradation and another eighteen, and all the other flights had no undesirable transition. It is therefore no longer appropriate to adjust a continuous distribution to the histogram obtained in FIG. 1 and to deduce therefrom a threshold for counting, by adapting the previous methods.

There thus exists a need for determining a strategy for monitoring degradation of an onboard device of an aircraft from a counting of events having a low occurrence of appearance, making it possible to automatically trigger an alarm while reliably and precisely complying with a given alarm probability Pa.

The invention proposes a simple and effective solution to this problem.

General Presentation of the Invention

To this end the invention proposes a method for monitoring degradation of an onboard device of an aircraft during functioning thereof, implemented by a computer, the degree of degradation of the onboard device being defined by an abnormality score formed by the counting of occurrences of abnormalities noted by a control system of the device during functioning thereof, the monitoring method comprising a step of comparing an abnormality score obtained for an observation sequence of given length with a decision threshold ks and a step of issuing an alarm in the event of the decision threshold ks being reached or exceeded, the decision threshold ks being determined automatically for a given probability of alarm Pa, corresponding to the probability that an alarm will be issued during the monitoring method whereas the onboard device is sound, by means of the following steps:

a step of obtaining an abnormality score on at least one reference sequence corresponding to flights of the aircraft without degradation and with a length equal to a plurality of lengths of observation sequences;

a step of adjusting a discrete probability law making it possible to find the abnormality score obtained on the reference sequence;

a step of calculating the decision threshold ks such that, by applying the adjusted discrete probability law during the previous step to an observation sequence having the given length, the probability of an abnormality score higher than or equal to the decision threshold (ks) occurring a number S of times for N consecutive sequences is less than an elementary probability Peac of exceeding of a threshold evaluated from the given alarm probability Pa, N and S being able to be equal to one.

Preferably, the elementary probability Peac of exceeding of a threshold is evaluated from the given alarm probability Pa by means of the formula:

$$Peac=B_{S,N-S+1}^{-1}(Pa)$$

in which N is the number of observation sequences, S the number of times where the threshold ks will have been exceeded for N successive sequences, and $B_{S,N-S+1}^{-1}$ the inverse Euler beta distribution function of parameters S and N−S+1.

In other words, the value of the threshold ks is the number of occurrences of an abnormality during an observation sequence from which the hypothesis that a sound device having an abnormality occurrence probability represented by the discrete probability law that has been adjusted to the reference sequence is not tenable with a probability greater than Pa, or Peac. Therefore, if the number of occurrences of abnormalities over an observation sequence reaches the decision threshold ks, either once or p times in a strategy with confirmation, it can be concluded from this that the device is no longer following a behaviour corresponding to a device without degradation with a risk of being mistaken of less than Pa. With known probability laws, it is possible to calculate this decision threshold ks using the expression of their inverse distribution law. This method is particularly advantageous when the reliability of the device gives rise to the fact that the detection of abnormalities corresponds to the counting of rare events, when the identification of a continuous law is impossible on the histogram of countings.

According to a preferred aspect of the invention, the discrete probability law used represents a phenomenon, the occurrences of which have a given probability per unit of time, the second step corresponding to an estimation of the probability per unit of time in the discrete probability law for finding the abnormality score obtained over the reference sequence. Said probability law may be a binomial law or a Poisson law, parameterised by the probability per unit of time and sequence length.

In the previous case, the estimation of the probability per unit of time of the occurrences of abnormalities for the system without degradation in the discrete probability law may be equal to an upper bound of this probability per unit of time with a given confidence for the abnormality score in the reference sequence. Preferably, the estimation of the probability per unit of time is equal to the maximum likelihood corresponding to the abnormality score obtained over the reference sequence.

Advantageously, an observation sequence corresponds to a plurality of successive flights of the aircraft.

The method according to the invention may comprise a step of predetermination of the given length for the observation sequences. The longer the observant sequence, the higher the detection threshold ks and the better will be the compliance with the alarm probability Pa or the elementary probability Peac. On the other hand, the phenomenon of degradation before failure will have to be all the slower in order to be detected in time. The choice of the length of an observation sequence may therefore be based on operational considerations of dismantling time and dynamics of physical degradation until failure.

This length of the observation sequence may advantageously be chosen so that the decision threshold (ks) is between three and ten. In the example presented, the length of the observation sequence is 60,000 time increments and the decision threshold calculated by the method takes the value 6.

According to a preferred aspect of the invention, the alarm probability Pa is obtained by the following formula:

$$Pa = \frac{Pe}{(1-Pe)} \cdot (1-\beta)_{a\ priori} \cdot \frac{Pd}{(1-Pd)}$$

a formula in which:

Pe corresponds to the probability that the onboard device is sound whereas an alarm is issued;

Pd corresponds to the probability of a degradation for an observation sequence; and $(1-\beta)_{a\ priori}$ corresponds to the probability of detection of an a priori degradation.

Advantageously, the alarm probability Pa is determined according to an error probability Pe that corresponds to the practical requirements of airlines wishing to reduce the number of unnecessary maintenance steps on onboard devices.

Preferably again, the method comprises:

a step of implementing the method for monitoring degradation of the onboard device, with the previously determined decision threshold (ks), for a plurality of abnormality scores formed for a plurality of observation sequences with degradation in order to deduce therefrom a probability of detection of an a posteriori degradation $(1-\beta)_{a\ posteriori}$;

a step of determining a new alarm probability Pa according to the probability of detection of an a posteriori degradation $(1-\beta)_{a\ posteriori}$;

a step of determining a new decision threshold (ks) refined from the new alarm probability.

These steps advantageously make it possible to refine the value of the decision threshold quickly and reliably.

PRESENTATION OF THE FIGURES

The invention will be understood better from a reading of the following description given solely by way of example and with reference to the accompanying drawings, in which.

DESCRIPTION OF ONE OR A PLURALITY OF EMBODIMENTS AND IMPLEMENTATIONS

The automatic determination of a decision threshold will be presented for a method for monitoring degradation of an onboard device of an aircraft as known from the prior art, for example through the patent application under the U.S. Pat. No. 1,358,593 of the company SNECMA.

As is known, the degree of degradation of the onboard device is defined by an abnormality score obtained by counting in the course of "clock pips", determining regular unit time increments, a number of undesirable transitions of an indicator for the state of the device established by the monitoring system. In the case described, the state of the device can adopt two values and can therefore be coded in a binary fashion indicating the possible occurrence of an abnormality. Preferably, the abnormality score is formed by an onboard computer of the aircraft connected to the onboard device by a communication link.

To take into account the fact that the functioning of the device may exhibit abnormalities even when it is not degraded, the method corresponds, as in the prior art, to a strategy for issuing an alarm only with an alarm probability Pa corresponding to a proportion of false alarms Pfa imposed.

When an alarm is issued, a step of maintenance of the onboard device must be implemented by the airline in order to prevent a failure of said onboard device.

Alarm Probability

Alarm probability means the probability that an alarm is issued during the monitoring method whereas the onboard device is sound, that is to say without established degradation. In other words, an alarm probability Pa of 1% corresponds to the issuing of an alarm for 100 flights without degradation.

In practice, the alarm probability Pa is not directly known. This is because the specifications of airlines impose as a criterion an error probability Pe that corresponds to the probability that the onboard device is sound whereas an alarm is issued. In other words, an error probability Pe of 1% corresponds to a sound onboard device for 100 alarms issued.

In practice, when an alarm is issued by the monitoring method, a maintenance operation is implemented by the airline. Limiting the error probability Pe thus allows the airlines to limit the number of maintenance operations on an onboard device that is sound, such operations giving rise to unnecessary operating costs.

Preferably, the alarm probability Pa is determined according to the error probability Pe by means of the following conditional probability formula (F1).

$$Pa = \frac{Pe}{(1-Pe)} \cdot (1-\beta)_{a\ priori} \cdot \frac{Pd}{(1-Pd)} \quad (F1)$$

The formula (F1) comprises the following parameters:
β corresponds to the probability of non-detection of a degradation for a given flight, 1-β then corresponding to the probability of detection of a degradation; and
Pd corresponds to the probability of a degradation for a given flight.

The formula (F1) is derived from conditional probability equations in which the probability Pa corresponds to an alarm knowing the sound device (Pa=P(Alarm|Sound)) and the probability Pe corresponds to a sound device knowing that an alarm is issued (Pe=P(Sound|Alarm)).

$$P(Sound|Alarm) = \frac{P(Alarm|Sound)}{P(Alarm)} = \frac{P(Alarm|Sound)}{P(Sound)} \cdot \frac{P(Sound)}{P(Alarm)} =$$
$$P(Alarm|Sound) \cdot \frac{P(Sound)}{P(Alarm)} = Pa \cdot \frac{P(Sound)}{P(Alarm)}$$

In other words $$P(Alarm) = Pa \cdot \frac{P(Sound)}{P(Sound|Alarm)} = Pa \cdot \frac{(1-Pd)}{Pe}$$

Furthermore, as $P(Alarm)=P(Alarm \cap Sound)+P(Alarm \cap Degraded)$ $P(Alarm)=P(Alarm|Sound) \cdot P(Sound)+P(Alarm|Degraded) \cdot P(Degraded)$ with $P(Degraded)=Pd$ $P(Sound)=1-Pd$ $P(Alarm|Degraded)=1-\beta$ $P(Alarm\ Sound)=Pa$ $P(Sound\ Alarm)=Pe$ $P(Alarm)=P(Alarm|Sound) \cdot P(Sound)+P(Alarm|Degraded) \cdot P(Degraded)$ $P(Alarm)=Pa \cdot (1-Pd)+(1-\beta) \cdot Pd$ $P(Alarm)=Pa \cdot (1-Pd)+(1-\beta) \cdot Pd$ By means of the two equalities relating to P(Alarm), then (F1) is deduced therefrom.

In the formula (F1), the probability of a degradation for a given flight Pd is known by experimentation or estimation and may, for example, be around $10^{-7}$. The probability of detection of a degradation $(1-\beta)_{a\ priori}$ is fixed "a priori" at 1 and refined by iteration as will be detailed hereinafter in order to improve the precision of the decision threshold.

By way of example, an alarm probability Pa of around $5.10^{-8}$ is conventionally obtained for an error probability Pe required of around 5%, a probability of detection of a degradation $(1-\beta)_{a\ priori}$ of around 1 and a probability of a degradation for a flight Pd of around $10^{-6}$.

Discrete Abnormality Score and Discrete Probability Law

In the present method an observation sequence length is determined, consisting in the example of a number n of counting increments and a threshold ks on the number k of appearances of abnormalities, corresponding in the example to undesirable transitions, during a sequence, for triggering the alarm. The length of an observation sequence may correspond to a flight or to a plurality of consecutive flights. The abnormality score over a sequence is defined as the number k of occurrences of abnormalities.

However, a threshold on the value of the abnormality score assumed to be continuous is no longer determined, as in the examples cited. The method refers to a discrete probability law for representing the occurrences of abnormalities and evaluating the threshold ks as from which it is possible to trigger an alarm while complying with an alarm probability Pa.

In a first example embodiment, a probability law represented by a binomial distribution is used.

The binomial law of parameters n and p corresponds to the fact of renewing on a sequence n times independently the selection of an event that has a probability p of occurring and a probability (1−p) of not occurring. The number of appearances of the event, here an abnormality, are then counted, and the random variable indicating this number of appearances over the sequence of n selections is called X.

The probability that the random variable X takes a value k between 0 and n over the sequence is then given by the binomial distribution:

$$P(X=k) = \begin{bmatrix} n \\ k \end{bmatrix} p^k \cdot (1-p)^{n-k}$$

The distribution function of the law of the binomial $F_{n,p}$ provides a probability that the random variable X takes a value less than or equal to k for a sequence of n selections.

The value $F_{n,p}(k)$ of the distribution function of the law of the binomial in X=k can also be expressed using a Euler beta distribution function of the probability of occurrence p by selection and of parameters k+1 and n−k.

This probability law is well suited to the case described for which the counting of any abnormalities is done at regular intervals of unit duration, supplied by the "clock pips" of the monitoring system during a flight.

In a second example embodiment, a Poisson probability law is used.

The Poisson law of parameters (λ. t) corresponds to the behaviour of the number of abnormalities occurring in an observation sequence, the length of which is the time t, if these abnormalities occur with a known mean frequency λ and independently of the time elapsed between two appearances of abnormalities. This frequency corresponds to a probability of occurrence per unit of time.

The probability that there exist k occurrences of the abnormality over an observation sequence of duration is then given, in the case where t is a multiple of the increment of time for which the frequency λ is expressed, by:

$$P(X=k) = \exp(-\lambda t) \cdot \frac{(\lambda \cdot t)^k}{k!}$$

The distribution function of the Poisson law $F_{\lambda.t}$ provides the possibility that the random variable X takes a value less than or equal to k for a sequence of length t.

The distribution function value $F_{\lambda.t}(k)$ of the Poisson law in X=k can also be expressed by a Euler gamma distribution function of the frequency λ.t of occurrence over the period t, having the parameters k+1 and t.

The Poisson law constitutes a passage to the limit of the binomial law when the number of selections is very great. It is therefore also suitable for the case described when the number of "clock pips" is very great. It is also suitable for the case of a device where the monitoring system indicates abnormalities only when they occur, that is to say at irregular intervals. In this case, the Poisson law makes it possible to make the calculations over an interval of time that is not a multiple of increments between successive countings.

Example of a First Embodiment of the Method

The method will now be described using the binomial law, the monitoring system indicating a binary result of the occurrence of an abnormality or not for regular time increments.

Figure 2:
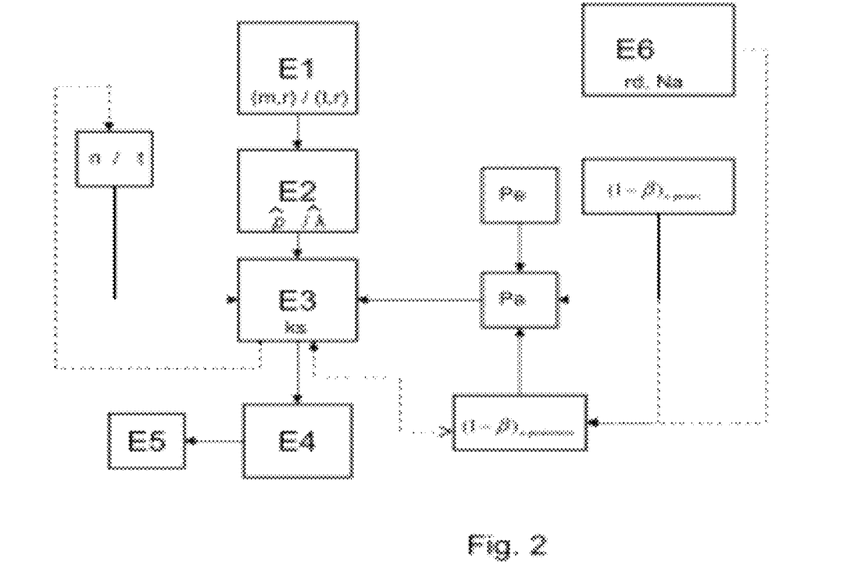
FIG. 2 is a schematic diagram of a monitoring method comprising steps for automatic determination of the decision threshold according to the invention.

With reference to FIG. 2, the method begins with a first step E1 of extracting a plurality of abnormality scores for a plurality of flights without degradation with the device being monitored.

In particular, this step E1 makes it possible to create at least one reference sequence consisting of a large number of flights without degradation, which corresponds to a very large number m of detection time increments of the abnormality indicator for a device without degradation, and to form an abnormality score r on this reference sequence, equal to the sum of the occurrences of abnormalities.

In the example corresponding to the monitoring of a device described by the patent application under the number U.S. Pat. No. 1,358,593, illustrated in FIG. 1, the results were observed for 750 flights without degradation, each flight comprising 1200 time increments in transient phase, corresponding to the period during which the device is stressed. This makes it possible to build a reference sequence of length m, m being equal to 750×1200=90,000 time increments, for which an abnormality score r was found, r being equal to 1+18=19.

A second step E2 of the method, before commencing the monitoring, consists of seeking an estimation p̂ of the probability p of occurrence of an abnormality at each time increment, using the reference sequence.

The estimation p̂ is obtained by taking an upper bound $\hat{p}_\alpha$ of p with a degree of confidence α. Its value is obtained by the formulae: $\hat{p}_\alpha = \{p | 1 - F_{m,p}(r) = \alpha\} = B_{r+1,m-r}^{-1}(\alpha)$ $F_{m,p}$ is the binomial distribution of functions of parameters m and p, where m is the number of time increments of the reference sequence and p a probability of occurrence, applied to the abnormality score r noted for the reference sequence.

$B_{r+1,m-r}^{-1}$, which is the inverse Euler beta distribution function of parameters r+1 and m−r makes it possible to directly calculate the estimation $\hat{p}_\alpha$ with a degree of confidence α.

For the method it is thus possible to use α=90% or α=50%. It is also possible to use a value α=44%, which corresponds to the maximum likelihood. In this case, the estimation $\hat{p}_\alpha$ is directly supplied by the ratio r/m.

Figure 1:
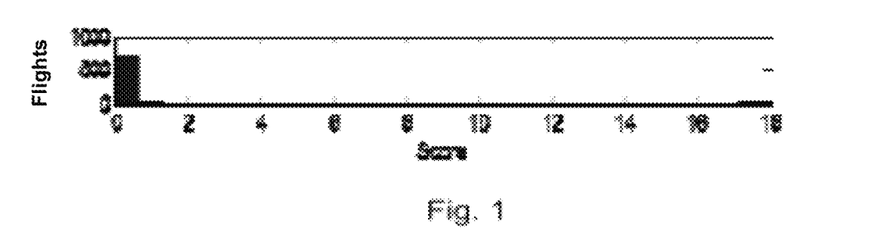
FIG. 1 shows the distribution of abnormality scores obtained for an onboard measuring device of an aircraft for a plurality of flights without degradation.

With the values of the monitoring sequence supplied for example in FIG. 1, of length m=90,000 increments with an abnormality score r=19, there is obtained: $\hat{p}_{90\%} = 2.88 \cdot 10^{-5}$, $\hat{p}_{50\%} = 2.19 \cdot 10^{-5}$ and the estimate of the maximum likelihood, $\hat{p}_{ML} = r/m \approx \hat{p}_{44\%} = 2.11 \cdot 10^{-5}$.

The method next comprises a third step E3 in which the threshold ks on the number k of occurrences of abnormalities in an observation sequence of length n time increments is determined, for which it can be considered that the probability of occurrence of abnormalities is greater than the estimation $\hat{p}$ of the probability of occurrence of abnormalities for a device without degradation, done in the preceding step E2 from the reference sequence, with a probability of being mistaken equal to the value Pa defined by the formula F1.

For this purpose, the threshold ks of detection of degradation on the number k of occurrences of abnormalities during an observation sequence of n increments is determined so that ks is the smallest integer for which the distribution function of the probability law over an observation sequence, that is to say such that the probability that there are k abnormalities for any k less than ks on this sequence, approaches the value of a unit by less than the given alarm probability Pa.

This results in the formula:

$$ks = Inf\{k | 1 - F_{n,\hat{p}}(k-1) \le Pa\} = Inf\{k |_{k,n-k+1}(\hat{p}) \le Pa\} \quad (F2)$$

where $F_{n,\hat{p}}$ is the binomial distribution function of parameters, the number of increments n chosen for the observation sequence and the estimation $\hat{p}$ of the probability of occurrence of the abnormality at each increment for a device without degradation, obtained during the previous step E2.

$|_{k, n-k+1}$ is the Euler beta distribution function of parameters k and n−k+1, applied to the estimation $\hat{p}$ of the probability of occurrence.

In other words, ks is the number of occurrences of an abnormality among the n time increments of the observation sequence from which the hypothesis that the true probability p per time increment of the occurrences of abnormalities is equal to the estimation $\hat{p}$ is not tenable with a probability greater than Pa. Therefore, if k is greater than or equal to ks, it can be concluded from this that the probability p per time increment of the occurrences of abnormalities has exceed the estimation $\hat{p}$ for a device without degradation with a probability of being mistaken of less than Pa.

The choice of the number n of increments for an observation sequence is the result of a compromise. This number must not be too small since this then gives rise to an excessively low value of ks and excessively great lack of precision in the alarm probability complied with. Conversely, this number must not be too great since there is then a risk of allowing degradation of the device being monitored to develop.

The choice of the length n of the observation sequence can be made from knowledge of the device, through simulations before implementing the method in the onboard computer. In a variant of the method, an additional step can be implemented in order to refine the length of the observation sequence according to values of the threshold ks calculated at step E3, so for example that this threshold takes a value between a few units and ten.

In practice, for monitoring the devices referred to by the aeronautical applications, the length n of increments of the observation sequence corresponds to a few successive flights, the number nv of flights preferably being situated between three and ten.

For the device already cited for illustration, an observation sequence of five successive flights corresponds to n=5×1200=6000 observation increments. By adopting the objective value of $5.10^{-8}$ for the alarm probability Pa, applying formula F2 results in a value of ks equal to six (ks=6).

The method therefore next comprises a step E4 of monitoring the device in operation, which follows successive observation sequences of n increments, for example during a number nv of successive flights. In this step E4, an alarm E5 is triggered if the number of occurrences of abnormalities reaches the value ks during an observation sequence.

Example of a Second Embodiment of the Method

In this second embodiment a Poisson law is used, the monitoring system indicating a binary abnormality result or not for regular time increments, as in the first embodiment.

The first step E1 of extracting a plurality of abnormality scores for a plurality of flights without degradation with the device being monitored is here identical to the one implemented in the first embodiment. Here, the reference sequence of m time increments has a duration equal to tc. The increments being of equal unit duration in the example, the duration tc of the sequence can be counted in number of increments.

The second step E2 of the method, before commencing the monitoring, consists of seeking an estimation $\hat{\lambda}$ of a mean frequency $\lambda$ of occurrence of an abnormality at each time increment, using the reference sequence.

The estimation $\hat{\lambda}$ is obtained by taking an upper bound $\hat{\lambda}_\alpha$ of $\lambda$ with a degree of confidence $\alpha$. Its value is obtained by the formulae:

$$\hat{\lambda}_\alpha = Sup\{\lambda | 1 - F_{\lambda \cdot t_c}(r) \le \alpha\} = \Gamma^{-1}_{r+1, t_c}(\alpha).$$

$F_{\lambda \cdot t_c}$ is the Poisson distribution function of parameter $\lambda$ times tc, where tc is the duration of the reference sequence and $\lambda$ a probability of occurrence per time increment of unit duration, applied to the abnormality score r noted for the reference sequence.

$\Gamma^{-1}_{r+1, t_c}$, which is the inverse Euler gamma distribution function of parameters r+1 and tc, makes it possible to directly calculate the estimation $\hat{\lambda}\alpha$ for a degree of confidence $\alpha$.

It is also possible, in a variant, to evaluate the estimation $\hat{\lambda}\alpha$ by the value of $$\frac{\chi^{2 \, -1}_{2 \cdot r+2}(\alpha)}{2 \cdot t_c},$$

where $\chi^{2-1}_{2 \cdot r+2}$ is the inverse distribution function of the chi-squared distribution with 2r+2 degrees of freedom.

To implement this method, it is thus possible to use, as in the first embodiment, $\alpha=90\%$, $\alpha=50\%$ or $\alpha=44\%$, which corresponds to the maximum likelihood.

With the values of the monitoring sequence supplied as an example in FIG. 1, of length tc=90,000, counted in time increments, with an abnormality score r=19, there is obtained: $\hat{\lambda}_{90\%}=2,88 \ 10^{-5}$, $\hat{\lambda}_{50\%}=2,19 \ 10^{-5}$ and the estimate of the maximum likelihood $$\hat{\lambda}_{ML} = \frac{r}{t_c} \approx \hat{\lambda}_{44\%} = 2,11 \ 10^{-5}.$$

In the third step E3 of this embodiment of the method, the threshold ks is determined on the number of occurrences k of abnormalities in an observation sequence of duration t, for which it can be considered that the probability of occurrence of abnormalities is greater than the estimation ˆ of the probability of occurrence of abnormalities for a device without degradation from the reference sequence, with a probability of being mistaken equal to the value Pa defined by the formula F1.

For this purpose, the detection threshold ks on the number k of occurrences of abnormalities during the period t of an observation sequence is determined, in a manner similar to that of the first embodiment, as being the smallest integer such that the distribution function of the probability law on an observation sequence approaches the value of a unit by less than the given alarm probability Pa.

This results in the formula:

$$ks = Inf\{k | 1 - F_{n,\hat{\cdot}t}(k-1) \le Pa\} = Inf\{k|_{k,t}(\hat{\cdot}) \le Pa\} = Inf\{k|_{2\cdot k}^2(2\cdot\hat{\cdot}t) \le Pa\} \quad (F3)$$

where $F_{n,\hat{\cdot}t}$ is the Poisson distribution function of parameter $\hat{\cdot}t$ equal to the product of the period t chosen for the observation sequence and of the estimation $\hat{\cdot}$ of the frequency of occurrence of abnormalities at each time increment for a device without degradation, obtained during the previous step.

$_{k,t}$ is the Euler gamma distribution function of parameters, the number k of occurrences of abnormalities on the observation sequence and the duration t of the observation sequence.

In a preferential alternative, it is possible to use the distribution function of the $^2$ with 2 k degrees of freedom $_{2\cdot k}^2$ for estimating ks in the formula F3.

The same arguments as in the first embodiment make it possible to conclude that, if k is greater than or equal to ks, the mean frequency of occurrence of an abnormality at each increment has exceeded the estimation $\hat{\cdot}$ for a device without degradation with a probability of being mistaken of less than Pa.

The choice of the number n of increments for an observation sequence is made in the same way as in the first embodiment described. In practice, for monitoring the devices relating to aeronautical applications, the length of the observation sequence corresponds to a few successive flights, their number n preferably being situated between three and ten.

For the example already cited as an illustration, an observation sequence of five successive flights corresponds to a period t equal to 6000 observation increments. By adopting the objective value of $5 \cdot 10^{-8}$ for the alarm probability Pa, applying formula F3 results in a value of ks equal to six (ks=6).

The similarity of the results obtained in the two embodiments is in agreement with the fact that the two probability laws used are equivalent over a very large number of increments.

Variant Using a Strategy of Confirmation of p Exceedings of the Threshold for q Sequences The previous two embodiments were presented for the issuing of an alarm as soon as a threshold has been exceeded on a sequence. In a variant, a confirmation strategy "S from amongst N" can be applied to these embodiments, independently of the discrete probability law used for finding the abnormality score on a sequence.

In this strategy, an alarm is issued if the number of occurrences of abnormalities exceeds S times the threshold ks for N consecutive sequences. On the other hand, the value of the threshold ks corresponds here to an estimation Peac of the elementary alarm probability on a sequence repeated N times, for observing S times the exceeding of the threshold with a non-degraded device having an alarm probability Pa per sequence.

To do this, the number k of occurrences of an abnormality per sequence can be considered to be a random variable from a Bernoulli distribution, taking the sequences as increments. In this case, Peac can be estimated by means of the following formula:

$$Peac = B_{S,N-S+1}^{-1}(Pa) \quad (F4)$$

in which N is the number of observation sequences, S then a minimum number of times that the threshold ks will have been exceeded repeatedly in order to confirm the persistence of a detection signal, and $B_{S,N-S+1}^{-1}$ the inverse Euler beta distribution of parameters S and N−S+1. If N and S both equal one, Peac=Pa is found.

Figure 3:
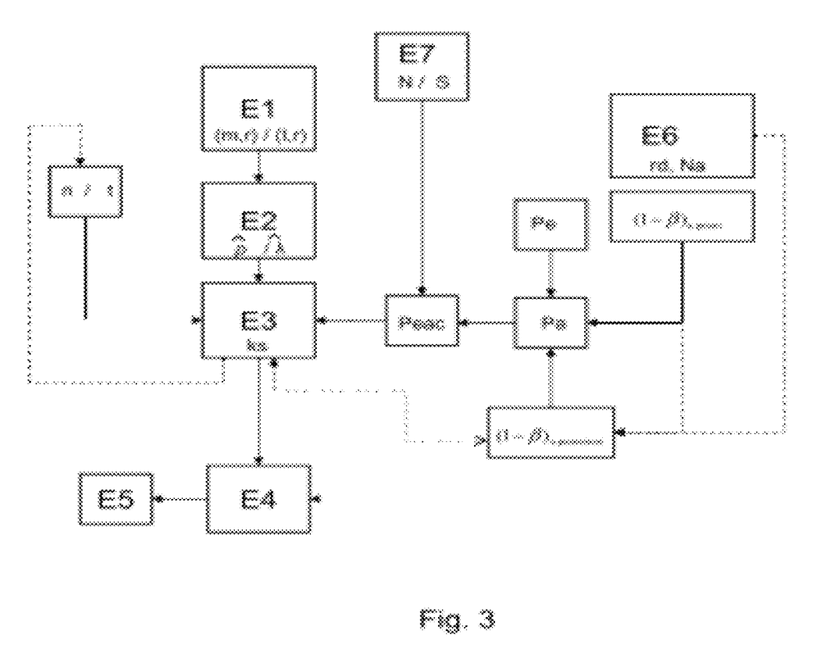
FIG. 3 is a schematic diagram of a variant of the monitoring method comprising steps of automatic determination of the decision threshold according to the invention.

In this variant, with reference to FIG. 3, the method comprises a step E7, corresponding to the choice of N and S for calculating the value Peac that will be used in place of Pa in step E3 for calculating the threshold ks with a view to complying with the alarm probability Pa with the confirmation strategy, and then in step E4, in which an alarm is issued after having observed an exceeding of the threshold S times in N successive sequences.

The higher the values of N and S chosen in step E7, the more reliable the threshold of detection for confirmation by p exceedings among q will be. On the other hand, the phenomenon of degradation before failure will have to be all the slower in order to be detected in time. The choice of N is therefore based on operational considerations with regard to dismantling times and physical degradation dynamics to failure. Once N has been chosen, S can be chosen in its turn in order to maximise the probability of detection. Moreover, generally, a sequence will correspond to a flight.

Refining of the Decision Threshold Value

A determination of the decision threshold was previously presented, in which the alarm probability Pa is known or estimated from the error probability Pe. When the alarm probability Pa is estimated, a step of refining the decision threshold S by refining the probability of detection of a degradation (1−β) as illustrated in the schematic diagrams in FIGS. 2 and 3 can be implemented optionally.

As illustrated in FIG. 2, in an evaluation step E6, the monitoring method is used with the decision threshold ks as previously determined for a plurality of observation sequences obtained during flights with degradation, preferably obtained by simulation. During the monitoring method, the abnormality scores rd obtained on the observation sequences are compared with the decision threshold ks, which makes it possible to deduce "a posteriori" the probability of detection of a degradation (1−β). This is because it suffices to observe the number of alarms Na issued with respect to the number of observation sequences corresponding to the flights with degradation monitored.

As illustrated in FIG. 2, the value $(1-\beta)_{a\ priori}$ is, by iteration, replaced, in the steps of determining the decision threshold, by the value $(1-\beta)_{a\ posteriori}$ obtained during refining in order to obtain a new value of the decision threshold S that is more precise. The refining step can be iterated in order to converge towards the value of the decision threshold S that is the most precise.

In one embodiment of the invention, the method for monitoring degradation of a device onboard an aircraft, the method for automatically determining a decision threshold and the method for generating degradations are implemented by a computer, preferably by a plurality of processors of the computer.

By way of example, the monitoring method is implemented in order to monitor a measuring chain on the turbojet engine.

The processor determining the decision threshold receives a plurality of degradation-free abnormality scores from the monitoring processor and, for a given error probability Pe and a probability of "a priori" detection of degradation by the monitoring method, determines the decision threshold ks. Once the decision threshold ks is determined, it is transmitted to the monitoring processor, which can then compare the abnormality scores calculated on the observation sequences of the same duration (n, t) as that used in the monitoring method at said decision threshold ks in order to monitor the change in the degradation of the measuring chain on the turbojet engine.

In order to refine the value of the decision threshold ks, the degradation-generating process simulates degraded flight data, which are submitted to the monitoring processor, which issues a certain number of alarms according to the data received, which makes it possible to deduce therefrom "a posteriori" the probability of detection of a degradation by the monitoring method. This value is then communicated to the processor determining the decision threshold $ks_i$, which supplies a new decision threshold value ks for the new detection probability obtained.

The process is iterated until a convergence of the value of the decision threshold ks is obtained. In practice, satisfactory convergence is obtained from two iterations.

The invention has been presented for a measuring chain on the turbojet engine but applies to any device onboard an aircraft.

The invention claimed is:

1. A method for monitoring degradation of an onboard device of an aircraft during functioning thereof, implemented by a computer, the degree of degradation of the onboard device being defined by an abnormality score formed by the counting of occurrences of abnormalities noted by a control system of the device during functioning thereof, the monitoring method comprising a step of comparing an abnormality score obtained for an observation sequence of given length (n, t) with a decision threshold (ks) and a step of issuing an alarm in the event of the decision threshold (ks) being reached or exceeded, the decision threshold (ks) being determined automatically for a given probability of alarm Pa, corresponding to the probability that an alarm will be issued during the monitoring method whereas the onboard device is sound, by means of the following steps:
a step of obtaining an abnormality score (r) on at least one reference sequence corresponding to flights of the aircraft without degradation and with a length (m, tc) equal to a plurality of lengths (n, t) of observation sequences;
a step of adjusting a discrete probability law making it possible to find the abnormality score (r) obtained on the reference sequence;
a step of calculating the decision threshold (ks) such that, by applying the adjusted discrete probability law during the previous step to an observation sequence having the given length (n), the probability of an abnormality score higher than or equal to the decision threshold (ks) occurring a number S of times for N consecutive sequences is less than an elementary probability Peac of exceeding of a threshold evaluated from the given alarm probability Pa, N and S being able to be equal to one, in which the elementary probability Peac of exceeding of a threshold being evaluated from the given alarm probability Pa by means of the formula:

$$Peac = B_{S,N-S+1}^{-1}(Pa)$$

in which N is the number of observation sequences, S the number of times where the threshold ks will have been exceeded for N successive sequences, and $B_{S,N-S+1}^{-1}$ the inverse Euler beta distribution function of parameters S and N−S+1.

2. The method according to claim 1, wherein the discrete probability law represents a phenomenon, the occurrences of which have a probability (p, λ) per unit of time, the second step corresponding to an estimation ($\hat{p}, \hat{\Box}$) of the probability (p, λ) per unit of time in the discrete probability law for finding the abnormality score (r) obtained on the reference sequence.

3. The method according to claim 2, in which the discrete probability law is a binomial law or a Poisson law, parameterised by a probability per unit of time and a sequence length.

4. The method according to claim 2, for which the estimation ($\hat{p}, \hat{\Box}$) of the probability (p, λ) per unit of time of the occurrences of abnormalities for the degradation-free system in the discrete probability law is equal to an upper bound of this probability per unit of time with a given confidence (α) for the abnormality score (r) in the reference sequence.

5. The method according to claim 2, for which the estimation ($\hat{p}, \hat{\Box}$) of the probability (p, λ) per unit of time of the occurrences of abnormalities for the degradation-free system is equal to the maximum likelihood of the probability (p, λ) per unit of time corresponding to the abnormality score obtained on the reference sequence.

6. The method according to claim 1, for which the length (n, t) of an observation sequence is defined by number (n) of observation increments of unit duration.

7. The method according to claim 1, for which an observation sequence corresponds to a plurality of successive flights of the aircraft.

8. The method according to claim 1, comprising a step of predetermination of the length (n, t) of the observation sequences.

9. The method according to claim 1, in which the alarm probability Pa is obtained by the following formula:

$$Pa = \frac{Pe}{(1-Pe)} \cdot (1-\beta)_{a\ priori} \cdot \frac{Pd}{(1-Pd)}$$

in which:
Pe corresponds to the probability that the onboard device is sound whereas an alarm is issued;
Pd corresponds to the probability of a degradation for aa given observation sequence; and
$(1-\beta)_{a\ priori}$ corresponds to the probability of detection of an a priori degradation.

10. The method according to claim 9, comprising:
a step of implementing the method for monitoring degradation of the onboard device, with the previously determined decision threshold (ks), for a plurality of abnormality scores formed for a plurality of observation sequences with degradation in order to deduce therefrom a probability of detection of an a posteriori degradation $(1-\beta)_{a\ posteriori}$, a step of determining a new alarm probability Pa according to the probability of detection of an a posteriori degradation $(1-\beta)_{a\ posteriori}$;

a step of determining a new decision threshold (ks) refined from the new alarm probability.

* * * * *